(12) United States Patent
Pereira et al.

(10) Patent No.: US 12,468,821 B2
(45) Date of Patent: Nov. 11, 2025

(54) DEVICE, SYSTEM AND METHOD FOR THE ENCRYPTED STORAGE OF CLINICAL-SURGICAL DATA

(71) Applicant: Ricardo Mendes Alves Pereira, São Paulo (BR)

(72) Inventors: Ricardo Mendes Alves Pereira, São Paulo (BR); Eduardo Mobilon, Campinas (BR); Rodrigo Bernardo, Campinas (BR)

(73) Assignee: Ricardo Mendes Alves Pereira, São Paulo (BR)

( * ) Notice: Subject to any disclaimer, the term of this patent is extended or adjusted under 35 U.S.C. 154(b) by 198 days.

(21) Appl. No.: 17/998,078

(22) PCT Filed: May 11, 2021

(86) PCT No.: PCT/BR2021/050195
§ 371 (c)(1),
(2) Date: Nov. 7, 2022

(87) PCT Pub. No.: WO2021/226692
PCT Pub. Date: Nov. 18, 2021

(65) Prior Publication Data
US 2023/0185928 A1 Jun. 15, 2023

(30) Foreign Application Priority Data
May 11, 2020 (BR) .......................... 102020009252-9

(51) Int. Cl.
*G16H 40/20* (2018.01)
*G06F 21/60* (2013.01)
*H04N 7/01* (2006.01)

(52) U.S. Cl.
CPC .......... *G06F 21/602* (2013.01); *G16H 40/20* (2018.01); *H04N 7/01* (2013.01)

(58) Field of Classification Search
CPC ....... G06F 21/602; G06F 21/72; G16H 40/20; G16H 20/40; H04N 7/01; H04L 2209/12; H04L 25/0266; H04L 9/0894
See application file for complete search history.

(56) References Cited

U.S. PATENT DOCUMENTS 6,147,542 A 11/2000 Yaklin
6,870,475 B2 3/2005 Fitch et al.
(Continued)

FOREIGN PATENT DOCUMENTS

WO 2019200445 A1 10/2019

OTHER PUBLICATIONS

WIPO, International Search Report (in priority application), Jul. 15, 2021.

*Primary Examiner* — Maung T Lwin
*Assistant Examiner* — Mudasiru K Olaegbe
(74) *Attorney, Agent, or Firm* — Laurence P. Colton; Smith Tempel Blaha LLC (57) ABSTRACT

The present invention describes means for encrypted storage of clinical-surgical data from a clinical-surgical environment, and a device adapted for such function being proposed. Specifically, the present invention comprises an integrator provided with a processor being capable of receiving clinical-surgical data from a plurality of signal sources, such that the integrator comprises an electrical isolator arranged at the inputs receiving the physical connections of the signal sources, providing a high degree security in order to avoid fraud, damage to data/signals generated in the clinical-surgical event and injury to the patient. The present invention refers to the fields of health, medicine, information technology and electrical engineering.

9 Claims, 7 Drawing Sheets

(56) References Cited

U.S. PATENT DOCUMENTS

| | | | |
|---|---|---|---|
| 8,108,039 B2 | 1/2012 | Saliga et al. | |
| 9,106,270 B2 | 8/2015 | Puterbaugh et al. | |
| 2002/0007198 A1* | 1/2002 | Haupert | A61N 1/37 607/30 |
| 2002/0186818 A1* | 12/2002 | Arnaud | G06Q 30/02 378/165 |
| 2003/0212581 A1* | 11/2003 | Adolph | G16H 40/67 705/3 |
| 2008/0004904 A1* | 1/2008 | Tran | G16H 40/67 340/286.07 |
| 2008/0146925 A1* | 6/2008 | Byrd | A61B 8/4427 600/438 |
| 2009/0018429 A1* | 1/2009 | Saliga | A61B 5/389 600/407 |
| 2012/0205979 A1 | 8/2012 | Gaalaas | |
| 2014/0089552 A1* | 3/2014 | Sala | G06F 13/385 710/313 |
| 2016/0147946 A1* | 5/2016 | Von Reden | G16H 10/60 705/3 |
| 2017/0249432 A1* | 8/2017 | Grantcharov | G06F 1/12 |
| 2018/0317826 A1* | 11/2018 | Muhsin | G06F 13/385 |
| 2019/0125457 A1* | 5/2019 | Parihar | A61B 17/0206 |
| 2019/0207911 A1* | 7/2019 | Wiener | G06F 8/65 |
| 2021/0158928 A1* | 5/2021 | Pereira | G16H 20/40 |

* cited by examiner

DEVICE, SYSTEM AND METHOD FOR THE ENCRYPTED STORAGE OF CLINICAL-SURGICAL DATA

FIELD OF THE INVENTION

The present invention describes a means of integrating signal sources for encrypted storage of clinical-surgical data, wherein the integrator is provided with an electrical isolator arranged in the inputs receiving the physical connections of the signal sources. The present invention refers to the fields of health, medicine, information technology and electrical engineering.

BACKGROUND OF INVENTION

In the field of health, there are several issues that must be broadly and widely discussed and analyzed. In the case of clinical environments, such as hospitals, wards, surgical centers, medical offices, there is a great need to execute processes with the highest degree of safety possible, in order to provide the necessary care to patients. In this case, any type of procedure that may occur improperly, or eventually, the occurrence of any obstacle, can imply great injuries to the patient and to the health system as a whole.

The inconveniences that can occur in clinical environments are diverse, ranging from a failure in surgical equipment to human error. Unfortunately, many of these failures occur and are not always detected, reported, or documented and, therefore, are not analyzed further.

Currently there are some practical solutions on the market aiming to assist in capturing and documenting information from surgical environments. An example is the solution of the document WO2019200455, which describes an equipment capable of receiving and integrating a plurality of clinical-surgical data and promoting it resizing and encrypted storage to provide a higher degree of security in medical actions.

When using this type of solution in clinical environments or in operating rooms, it is necessary to check several precautions before being put into operation. For example, electronic equipment that is adapted to be connected to medical devices may be at a different electrical potential than the medical device. This potential difference generates an electric current. Thus, if the medical device is in contact with a patient, this electrical current can be discharged into the patient himself/herself. Also, even if the potentials of the equipment are, in a certain way, equalized, any current surge that occurs in the power grid can be transferred to the medical device through the electronic equipment and, with that, be discharged in the patient.

As is known in the art, an electrical current of even low magnitude is enough to cause injury to the patient's health, for example, even causing ventricular fibrillation. There are even some regulations categorizing that when electronic equipment is electrically connected to a medical device (which may be in contact with the patient), this electronic equipment is considered an electromedical system.

Therefore, some isolation solutions for electronic equipment should be considered so that this type of equipment can be used during clinical-surgical procedures, increasing both the benefits the equipment itself can provide and the safety to avoid or reduce risks to the patient.

In the search for the state of the art in scientific and patent literature, the following documents were found that deal with the subject matter:

Document U.S. Pat. No. 6,147,542 describes a system of galvanic isolation between two circuits that are at different potentials, which uses a CMOS input with pull-up configured in the isolation barrier and an input buffer circuit. Said document shows a simple solution for galvanic isolation, without referring to high-speed signals.

Document US20120205979 describes a galvanic isolation circuit specifically adapted for USB communication. More specifically, the isolation system provides a multi-mode voltage regulator to support multiple voltage supply configurations. The system also provides control systems for each of the isolated loop systems and provides robust control in a variety of starting conditions. Said solution, however, provides a specific provision for USB communication, not supporting all types of signals that may traffic in documentation systems in medical environments.

Document US20140089552 also describes a galvanic isolation circuit for USB communication, being, in this case, employed in "hub"-type systems. Such a solution is concerned with solving communication problems between interfaces that may be physically distant, for example, in industrial environments. As with US20120205979, this solution provides a specific provision for USB communication, not supporting all types of signals that may traffic in documentation systems in medical environments.

Thus, from what can be seen from the researched literature, no documents were found anticipating or suggesting the teachings of the present invention, so that the solution proposed herein has novelty and inventive step compared to the state of the art.

Galvanic isolation circuits are commonly used to electrically isolate two or more systems and such circuits differ depending on its application, given that different types of signals can traffic through the systems. However, none of the solutions detected provides a galvanic isolation circuit supporting signals that can traffic in documentation systems in medical environments.

As can be seen, the prior art lacks a system for documenting data generated in clinical-surgical environments, which is capable of integrating a plurality of signals generated in these environments and, at the same time, providing a safe way for both patients and for the medical equipment itself, protecting against surges or de-equalization of electrical potentials.

In this sense, the goal is to develop a system for capturing and storing data obtained by electromedical systems in a way that provides greater protection to the patient and the equipment operator during a clinical-surgical event against accidents or electrical failures, in order to document information with a device that mitigate health risks.

SUMMARY OF THE INVENTION

Thus, the present invention solves the prior art problems from a solution capable of capturing the data/signals generated during a clinical-surgical event and concentrating this information in a device. Said device is provided in a safe way with a high degree of protection in order to avoid fraud, damage to data/signals generated in the clinical-surgical event and risks to the patient's health. Thus, clinical-surgical data are stored securely with restricted access to one or more operators or event managers, where this data can be reproduced and analyzed later securely.

Furthermore, the present invention provides for a secure electrical connection to occur between the device and medical sources providing electrical signals. To this end, the invention includes a galvanic isolation system, which isolates all signals from medical sources before they reach the device's signal integrator. This galvanic isolation system has a physical isolation barrier and a digital electronic isolator. The galvanic isolation system is designed to prevent electrical surges from reaching the patient and even generating unwanted electrical currents caused by any potential differences between the equipment.

In a first object, the present invention presents a device for encrypted storage of clinical-surgical data coming from at least one clinical-surgical event, which comprises at least one integrator (10) configured to receive clinical-surgical data from a plurality of signal sources (20), wherein the integrator (10) is provided with at least one processor (11) that captures the clinical-surgical data received by the integrator (10), said processor (11) being provided with at least one block of resizing and composition of clinical-surgical data, the integrator (10) of the said device for encrypted storage of clinical-surgical data comprising at least one electrical isolator (40) comprising: at least one digital isolator (47) positioned between the plurality of signal sources (20) and the processor (11); and a physical isolation barrier (46) arranged at one or more inputs for physical connections of the plurality of signal sources (20).

In a second object, the present invention presents a system for encrypted storage of clinical-surgical data coming from at least one clinical-surgical event, which comprises at least one signal source (20); at least one device for encrypted storage of clinical-surgical data (1), said device being as defined above; and at least one remote storage (30); wherein, said storage device (1) is communicating with the signal source (20) and the remote storage (30).

In a third object, the present invention presents a process for encrypted storage of clinical-surgical data coming from at least one clinical-surgical event, being implemented in at least one device for encrypted storage of clinical-surgical data, said device being as defined above, comprising the steps of receiving the clinical-surgical data by the integrator (10), the clinical-surgical data being originated from a plurality of signal sources (20); directing the clinical-surgical data to at least one input of the digital isolator (47), wherein the digital isolator converts the clinical-surgical data to isolated clinical-surgical data, transferring them to an output of the digital isolator (47); directing isolated clinical-surgical data to at least one input of the processor (11); resizing of clinical-surgical data isolated by the processor (11); and sending, by the processor (11), the clinical-surgical data resized to at least one of: image display (13); local storage (12); remote storage (30); or a combination thereof.

These and other objects of the invention will be immediately appreciated by those skilled in the art and will be described in detail below.

DETAILED DESCRIPTION OF THE INVENTION

The present invention provides a solution that provides encrypted storage of clinical-surgical data provided by clinical-surgical environments, in such a way that these clinical-surgical data can be safely reproduced and analyzed to people present in the environment.

In a first object, the present invention presents a device for encrypted storage of clinical-surgical data coming from at least one clinical-surgical event comprising at least one integrator (10) configured to receive clinical-surgical data from a plurality of data signal sources (20), wherein the integrator (10) is provided with at least one processor (11) that captures the clinical-surgical data received by the integrator (10), said processor (11) being provided with at least one block of resizing and composition of clinical-surgical data, the integrator (10) of the said device for encrypted storage of clinical-surgical data comprising at least one electrical isolator (40) comprising: at least one digital isolator (47) positioned between the plurality of signal sources (20) and the processor (11); and a physical isolation barrier (46) arranged at one or more inputs for physical connections of the plurality of signal sources (20).

With this, the storage device of the present invention can be installed locally in a clinical-surgical environment, in such a way as to collect and store information from the signal sources (20) present in the clinical-surgical environment, in addition to avoiding greater risks to the patient's health. For the purposes of exemplification, a clinical-surgical environment is any environment where a clinical-surgical procedure can be performed, for example, hospitals, wards, ambulances, surgical centers, medical offices, etc.

In one embodiment, the processor (11) of the integrator (10) is configured to construe the different communication protocols adopted by the different signal sources (20) of the clinical-surgical environment and, with that, to resize and compose the information through the block of resizing and compositing. In another embodiment, the processor (11) of the integrator (10) comprises a standard data entry protocol, so that the signal sources (20) of the clinical-surgical environment are already adapted to transfer data from this protocol, said block of resizing and composition being adapted to sequence the information for further distribution. Thus, the said processor (11) is responsible for resizing the clinical-surgical data in order to compose information with these data to later be forwarded to some other element.

In an embodiment wherein the clinical-surgical data are video signals, the block of resizing and composition of clinical-surgical data of the processor (11) is responsible for resizing the video signals that are entering the integrator (10), adjusting the respective resolutions for the composition of a new image containing the video signals.

For purposes of exemplification, the integrator (10) has the function of multiplexing signals from different sources and emitting a sequence of information capable of being read and interpreted. The integrator (10) comprises a base board (45) which is a printed circuit board wherein the inputs of the signal sources (20) are connected, as well as the processor (11) and the other components of the integrator (10).

In one embodiment, the signal sources (20) are defined by at least one of: laparoscopic surgical camera (22), vital signs or multiparameter video monitor (23), level of consciousness monitor (BIS), operating room camera (21), microphone or ambient audio of the surgical event (24) or a combination thereof. That is, the signal source (20) is any equipment posted in a clinical-surgical environment with data referring to the clinical-surgical procedure performed.

Furthermore, among the signal sources (20) are electromedical or medical grade systems. An electromedical system is understood to be at least one electromedical equipment or a combination of electromedical equipment that, in some way, is in contact with the patient. Such systems, for the most part, but without limitation, have their own electrical supply as they can operate individually from the storage device of the present invention. In this sense, to avoid an eventual difference between the potentials of the invention device and the signal sources (20), the integrator (10) was designed in order to comprise an electrical isolator (40). In one embodiment, the electrical isolator (40) is a galvanic isolator. The galvanic isolator of the present invention comprises at least one digital isolator (47), positioned between the plurality of signal sources (20) and the processor (11); and a physical isolation barrier (46) arranged at one or more inputs for physical connections of the plurality of signal sources (20).

The digital isolator (47) of the present invention comprises an input and output interface, wherein a set of signals from each signal source (20) is transferred between the input and output of the digital isolator (47) in isolation and directed to the processor (11). In one embodiment, a digital isolator (47) for each signal source (20) is implemented on the base board (45). With this, the set of signals from each signal source (20) is electrically isolated, at the same time which is transferred from the input to the output of the digital isolator (47).

The digital isolator (47) is a digital circuit, wherein both the input and the output of the digital isolator (47) are powered by the general electrical source of the integrator (10). In another embodiment, the input and output of the digital isolator (47) are connected to two separate supplies, independently, so the electrical isolation is maintained in the digital isolator (47).

In one embodiment, the digital isolator (47) of the present invention is electrically powered by an isolated DC/DC converter, which receives electrical power from a general electrical source of the integrator (10) and transfers isolated electrical power to the digital isolator (47). In one embodiment, the digital isolators (47) have independent power supply for the inputs and outputs, and, in this sense, the isolated DC/DC converter allows these inputs and outputs to be fed individually, with a view to avoiding or reducing the risks of any current surge coming from the electrical supply of the electromedical system reaches the connections with the signal sources (20) and, eventually, even the patient himself.

In one embodiment, the digital isolator (47) comprises capacitive isolation which uses an electric field as a form of energy to cross the isolation. Alternatively, in one embodiment, the digital isolator (47) comprises inductive isolation which generates an electromagnetic field proportional to the signal of interest as a form of energy to cross the isolation. In another embodiment, the digital isolator (47) comprises optical isolation using an LED that produces a light intensity proportional to the signal of interest received by a photodetector, thus traversing the isolation. A signal of interest is understood as the set of signals from the electrically isolated signal source (20).

In one embodiment, at least one of the signal sources (20) provides, as a clinical-surgical data, a high-speed video signal, for example, with transmission rates above 1 Gbit/s (e.g., 10.2 Gbit/s). Thus, in this embodiment, the integrator (10) comprises a speed reduction stage before directing the signal to the digital isolator (47). This stage allows the digital isolator (47) to have different technologies. Also, the integrator (10) has a step after the digital isolator (47), which avoids or minimizes data loss due to speed reduction, and after this step, the signal is directed to the processor (11).

In one embodiment, the physical isolation barrier (46) of the electrical isolator (40) is arranged at the signal inputs, that is, at the inputs that have a physical connection to the signal sources (20).

In one embodiment, the physical isolation barrier (46) may be arranged at all inputs to signal sources (20) or only inputs to signal sources (20) that interact with the patient.

Furthermore, the physical isolation barrier (46) of the present invention is arranged between input and output terminals of the digital isolator (47). In this way, the electrical isolation is reinforced at the terminals of the digital isolator (47) in order to avoid or reduce the risks of any electrical current surge reaching the connections through the terminals of the digital isolator (47).

In one embodiment, the electrical isolator (40) is implemented on the base board (45) itself, wherein the integrator circuit (10) itself is mounted.

In one embodiment, in the assembly of the integrator (10) base board (45), a strip connected to the physical isolation barrier (46) with a certain width is added, obeying the Clearance and Creepage distances, which inhibits the passage of unwanted electrical current surges in the circuit internal to the integrator (10). In this sense, the physical isolation barrier (46) aims to prevent the propagation of current surges that may occur superficially on the board, and, in the same way, the digital isolator (47) aims to prevent current surges that may arise from the electrical supply from reaching connections with signal sources (20), reducing the risk of electrical discharge in patients.

Furthermore, the integrator (10) is provided with an isolated signal ground (41) associated with the electrical isolator (40) positioned at the inputs of the signal sources (20), in addition to having its own internal signal ground (42) for signal reference of components connected to the processor (11) like the block for resizing and composing clinical-surgical data. There is also a protective ground (43) on the outside of the storage device of the invention, grounding the electromedical or medical grade system close to the ground provided by the device's own electrical power supply. In one embodiment, said power supply realizes the electrical supply of the device in general.

The storage device also has an external indicator (44) positioned on the integrator (10) indicating which inputs have said electrical isolation, as defined above. This type of indicator makes it possible to help the user when assembling the device, in addition to preventing electromedical systems, which must necessarily be isolated, from being connected to non-isolated inputs. For explanatory and exemplifying purposes, there are inputs, for example, which do not have electrical isolation in the same way, such as USB inputs for storage devices, ethernet input, Wi-Fi adapter input, in addition to the output connectors.

Thus, with the said electrical isolator (40), the storage device of the present invention aims to prevent surges that may occur in any of the inputs from being transferred to the patient, in addition to preventing electrical currents due to the difference between the potentials of the device and the signal sources (20) are generated and/or are discharged in the patient.

Moreover, said storage device comprises at least one local storage (12) communicating with the processor (11), in which the local storage (12) is configured to receive, store, and encrypt the clinical-surgical data coming from the processor (11). Said local storage (12) is any element installed locally on the storage device (1) capable of receiving, storing, and making available encrypted electronic data when requested. For purposes of example, the local storage (12) is a memory device, such as an external or internal HD, with SSD technology, but not limited to it.

In one embodiment, the storage device of the invention additionally comprises at least one redundant storage, which is operating in a mirrored manner with respect to the local storage (12) and also installed locally in the storage device (1). Said redundant store is a memory device, which may be the same as the local storage (12) or different, being able to store encrypted data from the processor (11). In one embodiment, the redundant storage operates in parallel with the local storage (12), so that the processor (11) sends the encrypted clinical-surgical data simultaneously to the local storage (12) and the redundant storage.

In this sense, an alarm system implemented in the processor is also provided which is capable of detecting and alerting the user/operator of the device for storing the invention in cases of: i) proximity to the local storage (12) storage capacity being exhausted (12) (either in the local storage (12) or in the redundant storage); and/or ii) failure of the local storage (12), the redundant storage or the transfer of data to a remote storage (30).

The device for encrypted storage (1) of clinical-surgical data of the present invention also allows the captured, integrated, and resized data to be made available separately by user and each user with their access key (password), can view locally or remotely. In this way, a video card capable of receiving the resized, composited, and synchronized data by the processor (11) and sending it to an image display (13), which is capable of reproducing the clinical-surgical data in video, is provided. In this sense, the image display (13) is connected to the storage device so that a user of the device can locally view the available content.

In one embodiment, the storage device (1) comprises an image capture, such as photographs of the clinical-surgical event, making them available on the image display (13) and also on the local storage (12) in a separate file from the images, being said image capture implemented in the processor (11). The proposed image capture performs the acquisition of one or more frames available in the image display (13), being, for example, through an instant freeze of the displayed video (e.g., photography).

In a second object, the present invention shows a system for clinical-surgical data encrypted storage coming from at least one clinical-surgical event, which comprises: at least one signal source (20); at least one device for encrypted storage (1) of clinical-surgical data, said device being as defined above; and at least one remote storage (30); wherein, said storage device (1) is communicating with the signal source (20) and the remote storage (30).

The device for storing clinical-surgical data from at least one clinical-surgical event, comprising at least one integrator (10) configured to receive clinical-surgical data from a plurality of signal sources (20), wherein the integrator (10) is provided with at least one processor (11) that captures the clinical-surgical data received by the integrator (10), said processor (11) being provided with at least one block of resizing and composition of clinical-surgical data, wherein the integrator (10) comprises at least one electrical isolator (40).

The storage device comprises at least one local storage (12) communicating with the processor (11), wherein the local storage (12) is configured to receive, store, and encrypt clinical-surgical data from the processor (11). Said local storage (12) is any element installed locally on the storage device (1) capable of receiving, storing, and making available encrypted electronic data when requested. For purposes of example, the local storage (12) is a memory device, such as an external or internal HD, with SSD technology, but not restricted to it.

In one embodiment, the storage device of the invention additionally comprises at least one redundant storage, which is operating in a mirrored manner with respect to the local storage (12) and also installed locally in the storage device (1). Said redundant store is a memory device, which can be the same as the local storage (12) or different, being able to store and encrypt data coming from the processor (11). In one embodiment, the redundant storage operates in parallel with the local storage (12), so that the processor (11) sends clinical-surgical data simultaneously to the local storage (12) and to the redundant storage.

In this sense, an alarm system implemented in the processor is also provided which is capable of detecting and alerting the user/operator of the device for storing the invention in cases of: i) proximity to the local storage (12) storage capacity being exhausted (12) (either in the local storage (12) or in the redundant store); and/or ii) failure in the local storage (12), in the redundant storage or in the transfer of data to the remote storage (30).

The device for encrypted storage of clinical-surgical data of the present invention also allows captured, integrated, and resized data to be made available separately by user and each user with their access key (password) can view locally or remotely.

In a third object, the present invention shows a process for clinical-surgical data encrypted storage originating from at least one clinical-surgical event, being implemented in at least one device for encrypted storage of clinical-surgical data, said device being as defined above, comprising the steps of receiving the clinical-surgical data by the integrator (10), the clinical-surgical data being originated from a plurality of signal sources (20); directing the clinical-surgical data to at least one input of the digital isolator (47), wherein the digital isolator converts the clinical-surgical data to isolated clinical-surgical data, transferring it to an output of the digital isolator (47); directing isolated clinical-surgical data to at least one input of the processor (11); resizing of clinical-surgical data isolated by the processor (11); and sending, by the processor (11), the clinical-surgical data resized to at least one of: image display (13); local storage (12); remote storage (30); or a combination thereof.

After receiving the clinical-surgical data by the integrator (10), these are directed to an input of the digital isolator (47), which is responsible for isolating this data from the physical connections of signal sources (20), so that the clinical-surgical data are transferred between the input and output of the digital isolator (47), being converted to isolated clinical-surgical data.

In one embodiment, the integrator (10) comprises the physical isolation barrier (46), which is arranged between the input and output terminals of the digital isolator (47), increasing the effectiveness of galvanic isolation. This type of physical isolation barrier (46) avoids or reduces the risk of current surges superficially on the base board (45) reaching the digital isolator terminals (47)—isolated side.

Since at least one of the signals of the plurality of signal sources (20) is a video signal, this video signal is pre-processed before being directed to the digital isolator (47). In one embodiment, the video signal is a high-speed signal and thus is subjected to a slowing down step, being converted to a slowed down video signal. Then the slowed down video signal is directed to the input of the digital isolator (47), where the slowed down video signal is converted to an isolated video signal. Thus, the isolated video signal is directed to a video signal converter, subsequently being directed to the processor (11). For the purposes of the present invention, the video signal converter is arranged to match the video signal to a standard readable by the processor (11).

In one embodiment, the slowing down step is implemented on an independent integrated circuit. In another embodiment, the slowing down step is integrated into the digital isolator' integrated circuit (47) itself. In one embodiment, the video signal converter is implemented on an independent integrated circuit. In another embodiment, the video signal converter is implemented in the integrated circuit of the digital isolator (47).

In this way, the isolated clinical-surgical data are directed to a processor input (11), which initiates an algorithm for resizing the clinical-surgical data in order to integrate the information from the signal sources (20), composing it in a single block of data synchronized and sequenced so that it can be properly interpreted by other elements. In one embodiment, the clinical-surgical data are video signals, so that the processor (11) resizes the images and composes it into a single image.

Thus, in one embodiment, the clinical-surgical data are sent in parallel to the image display (13) and to the local storage (12), so that they can be made available to an operator/user and be safely stored at the same time. In one embodiment, clinical-surgical data is additionally sent in parallel to the redundant store, increasing the security level of the generated data.

In one embodiment, the processor (11) sends clinical-surgical data to the remote storage (30) after the end of the clinical-surgical event. This procedure allows the storage device (1) to have its processing dedicated to storing the data generated in the clinical-surgical event in question, avoiding any type of failure or processing overhead. In one embodiment, the processor (11) erases the stored clinical-surgical data after sending the data completely to the remote storage (30) to free up space in the local storage (12). To do this, the processor (11) executes checking routines to verify whether the data has been completely transferred to the remote storage (30) or not.

Furthermore, said storage device (1) comprises at least one local storage (12) communicating with the processor (11), wherein the local storage (12) is configured to receive, store, and encrypt clinical-surgical data coming from the processor. (11). Said local storage (12) is any element installed locally on the storage device (1) capable of receiving, storing, and making available encrypted electronic data when requested. For purposes of example, the local storage (12) is a memory device, such as an external or internal HD, with SSD technology, but not limited to it.

The device for encrypted storage (1) of clinical-surgical data of the present invention also allows captured, integrated, and resized data to be made available separately by user and each user with their access key (password) can view locally or remotely. In this way, a video card is provided capable of receiving resized, composited, and synchronized data by the processor (11) and sending it to an image display (13), which is capable of reproducing the clinical-surgical. In this sense, the image display (13) is connected to the storage device so that a user of the device can locally view the available content.

There is also provided an alarm system implemented in the processor which is capable of detecting and alerting the user/operator of the storage device of the invention in cases of: i) proximity to the local storage capacity depletion (12) (either in the storage local (12) or in the redundant store); and/or ii) failure of the local storage (12), the redundant storage or the transfer of data to a remote storage (30).

Example 1—Integrator of Clinical-Surgical Signals and Data Provided with Electrical Isolation System The examples shown herein are intended only to exemplify one of the numerous ways of conducting the invention, however without limiting its scope.

Figure 1:
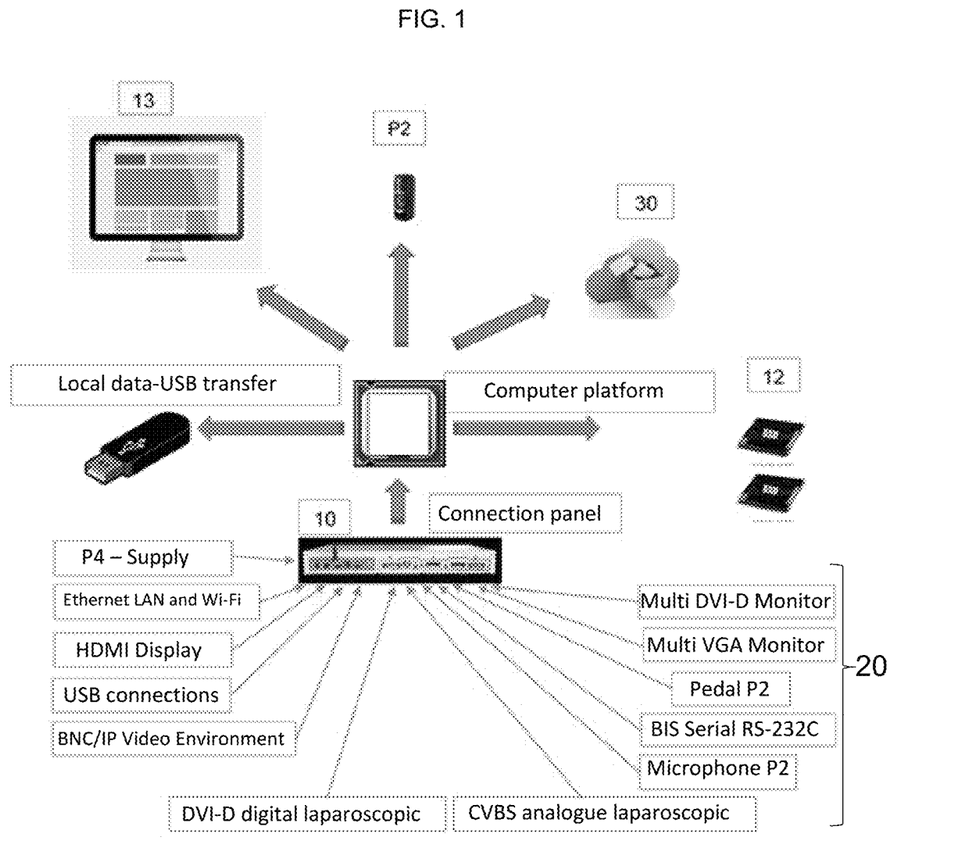
FIG. 1 shows an embodiment of a connection diagram for the integrator (10), in an overview, containing some examples of signal sources (20).

FIG. 1 shows an overview of the storage device of the present invention presented in the system as a whole, which is implemented in the clinical-surgical environment, where, as can be seen, the operating room camera, microphone, pedal, the camera laparoscopy surgery, level of consciousness monitor (BIS), and vital signs monitor are linked to the integrator (10).

Figure 2:
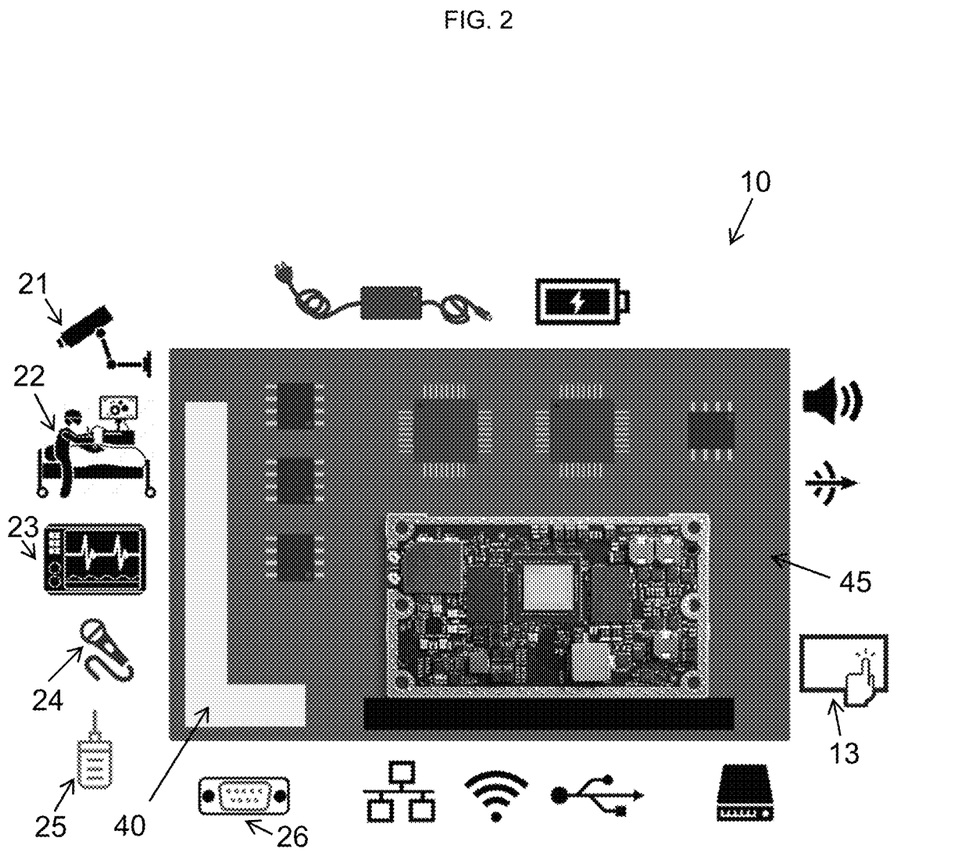
FIG. 2 shows an embodiment of a base board (45), wherein the electrical circuit of the integrator (10) is mounted, with the respective indications of the input/output peripherals.

It is exemplified in FIG. 2 the base board (45) where the electrical circuit of the integrator is mounted. As can be seen, in this demonstration schematic, the base board (45) is assembled with the respective integrated circuits around it. The circuits of the electrical isolators (40) are arranged in the inputs that receive the surgical laparoscopy camera (22), the vital signs or multiparametric monitor video (23), the microphone or ambient audio of the surgical event (24), the foot pedal trigger (for image capture) (25) and the serial input, for example, type RS-232C (26) for level of consciousness monitor (BIS). In this example, all these peripherals are or have a high chance of being in contact with the patient at the time of the clinical or surgical procedure. Thus, the electrical isolator (40) avoids or reduces the risks to the patient's life, preventing an unwanted electrical current from being discharged into the patient.

Furthermore, the other peripherals are not necessarily isolated to the same degree as those mentioned above. The following other peripherals are: power supply, integrated battery, operating room camera (away from the patient >1.5 m), integrated speaker, audio output, video output, touchscreen monitor, ethernet input, Wi-Fi adapter, USB, com ports for SSD devices, etc. Also, in this example, the device (equipment) is physically away from the patient, at a distance of at least 1.5 meters.

Figure 3:
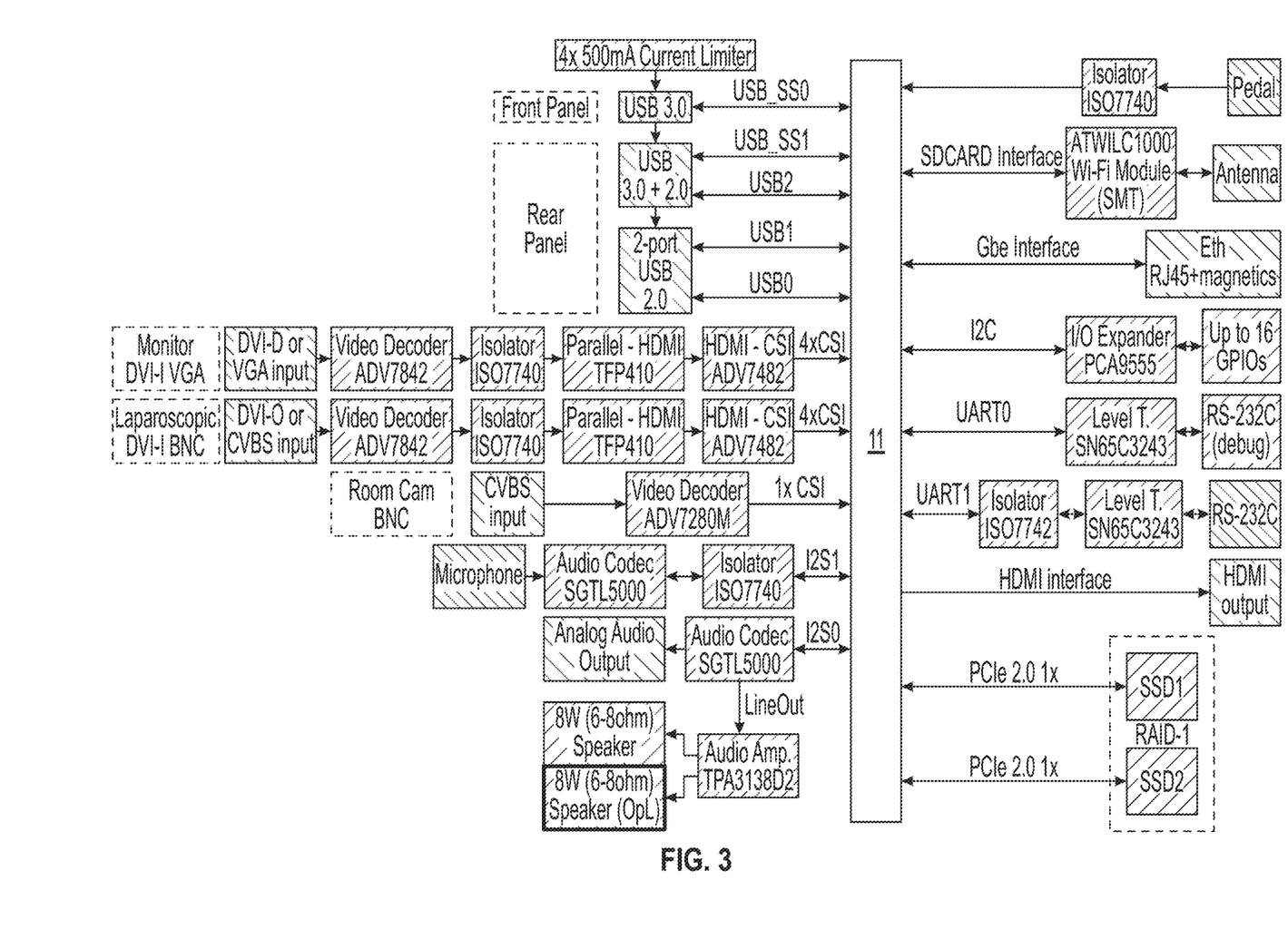
FIG. 3 shows an example of a connection diagram for the integrator (10) containing expanded detailing of the components/elements that are associated with the integrator (10).

FIG. 3 shows the architecture of the integrator (10) of example 1 containing all the hardware block structures linked to the respective inputs/outputs of the integrator (10). In this example, for the processor (11) an NVIDIA Jetson TX2 or Jetson TX2—4 GB was used. In the figure, the blocks in red indicate the peripherals whose respective input is isolated with the galvanic isolation integrated circuit included in the physical isolation barrier (46) of the electrical isolator (40).

Figure 4:
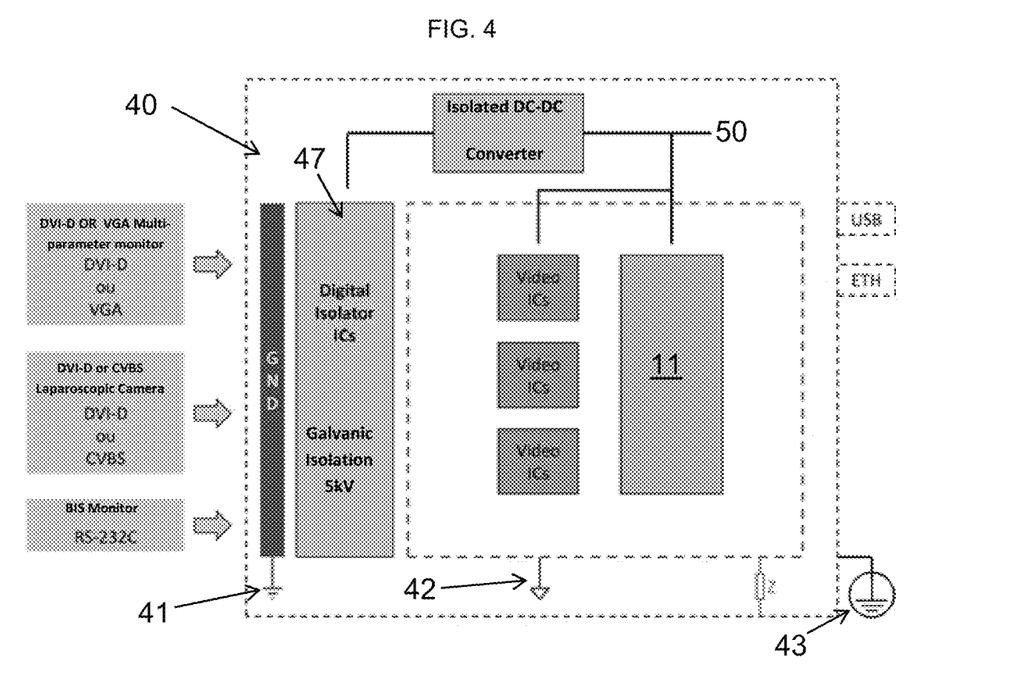
FIG. 4 shows an embodiment of a connection diagram of the integrator (10), showing in detail the inputs of signal sources (20) that are electrically isolated.

FIG. 4 shows in more detail what is explored in FIG. 3. As can be seen, the multiparameter monitor (via DVI-D or VGA), the surgical laparoscopy camera (via DVI-D or CVBS), the BIS monitor (via RS-232C), the pedal (photo) and the microphone are connected to the isolated inputs. In this scheme, a galvanic isolation of up to 5 kV was proposed, which can be changed according to demand or need. In addition, an isolating DC/DC converter, with up to 5 kV, is also powered by the power supply (50), separating the inputs from the video ICs that receive the signals from the inputs, therefore the signal from the signal sources (20) is converted according to the digital isolator (47) used. Such digital isolators (47) have two power inputs, one for the input interface and the other for the output, which makes it possible to apply isolated DC-DC converters, so that the electrical isolation extends to all electrical internal and external connections of the device, therefore, keeping the set of signals from each signal source (20) electrically isolated. As can be clearly seen in FIG. 4, the power supply (50) of the integrator itself (10) feeds the processor (11) and the video ICs without the bus entering the DC/DC converter. In the case of the digital isolator (47), the bus passes through the isolated DD/DC converter before reaching the digital isolator (47).

Still in FIG. 4, it is possible to observe that the galvanic isolation has a signal ground (41) that is isolated. Independently, there is the internal signal ground (42) which acts as a reference ground (or digital ground) for the integrator circuit components (10), such as the processor (11) and the video ICs itself. Additionally, there is the external protective ground (43), which grounds the equipment's frame itself through the power supply (medical grade). In addition, the digital isolator (47) performs the signal isolation, allowing only data from the signal sources (20) to pass.

Figure 5:
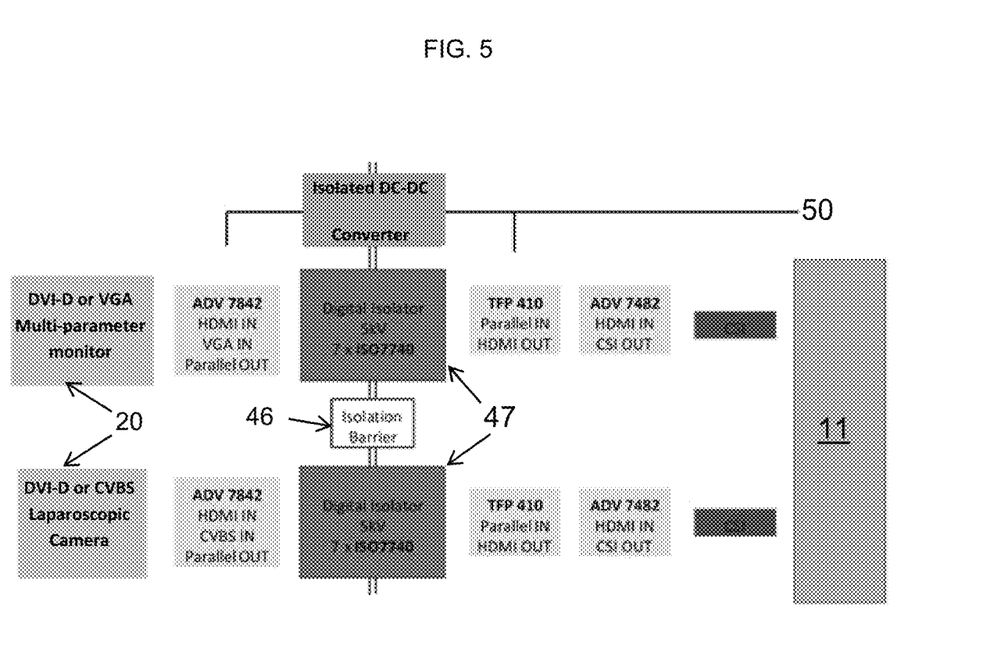
FIG. 5 shows an example of an association diagram of electronic components for the formation of the isolated region with digital isolator (47) and physical isolation barrier (46) of the integrator (10).

FIG. 5 shows in detail what is exposed in FIG. 4 in order to show the existence of the physical isolation barrier (46) between the digital isolators (47) and between the inputs and outputs of the digital isolators (47).

Still in FIG. 5, the example in question is based on the processing of high-speed video signals, in this case signals in the HDMI protocol, in order to obtain a video signal in Full HD (1920×1080). In these cases, the video signal is transmitted in the range of 10.2 Gbit/s (which is higher for other types of resolution). With the current configuration of available technology of digital isolators, they do not support signals with high transmission rate. For that, in this example, the digital isolator (47) of the example slows down the signals coming from the signal sources (20), through parallelization of the data buses so that they can be isolated by components and input channels. The first step of this chain is given by an HDMI receiver with multiple input interfaces, receiving DVI-D, VGA or CVBS signals. These inputs are converted to a 24-bit pixel bus. This parallelization reduces the bit rate of the signal to values below 200 Mbit/s, which in turn allows its connection to digital isolators (47) with capacitive technology, present in the second stage of the chain. After the signals pass through the digital isolator (47), the respective signals need to be converted to the processing module interface standard (NVIDIA Jetson TX2—TX 4 Gb), which is CSI. In a third step, serialization takes place from the 24-bit bus to an HDMI signal. The fourth and last step converts this HDMI signal to a CSI standard.

One of the ways to slowing down of the signals coming from the signal sources (20) during the first step of the chain is to parallelize the signal and divide it to seven different digital isolators (47), where galvanic isolation occurs in the second step. Then the isolated parallelized signal is serialized to an HDMI signal in the third step. Then, the fourth step is performed according to the previous paragraph.

Figure 6:
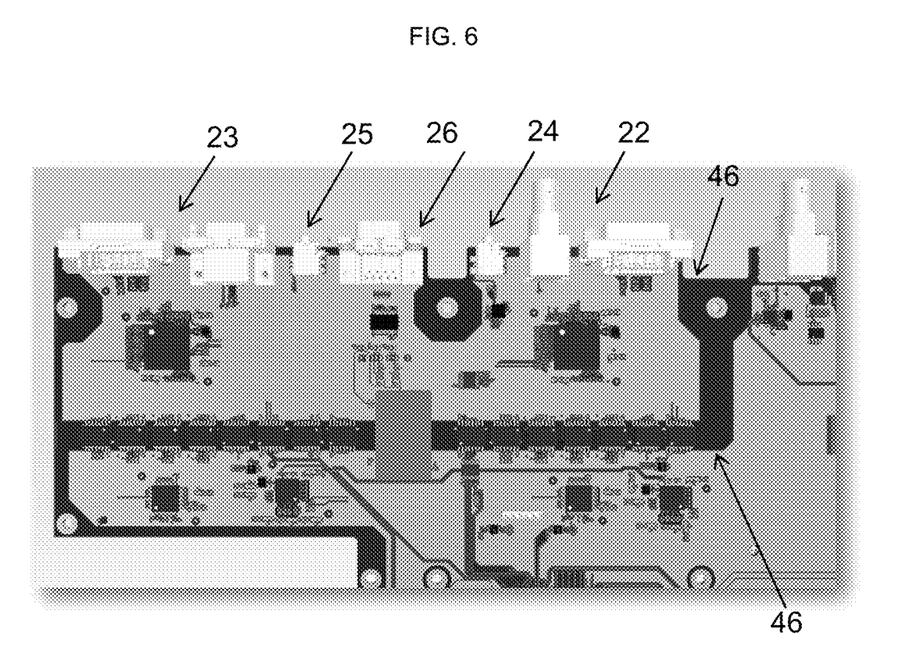
FIG. 6 shows an example of a base board (45) with the indication of the physical isolation barrier (46) implemented.

In FIG. 6 it is possible to verify the physical isolation barrier (46) of the electrical isolator (40) arranged at the ends of the base board (45) of the integrator (10). The width of the physical isolation barrier (46) in the central region of the integrator (10) highlighted was proposed in order to meet the Clearance and Creepage distances. Thus, the physical isolation barrier (46) permeates each digital isolator (47) in order to isolate the input and output of the digital isolator (47).

For this purpose, the physical isolation barrier (46) is composed of a solid isolating material between electrical current-carrying parts of the base board (45). Alternatively, electrical isolation is made possible by separation distance through air, thus separating components from the base board (45) to inhibit the connection between components even in an eventual electrical failure or deterioration of the base board (45). In this way, grooves are applied to the base board (45) performing isolation by separation distance through the air. Furthermore, the physical isolation barrier (46) can be formed by both alternatives defined above.

Figure 7:
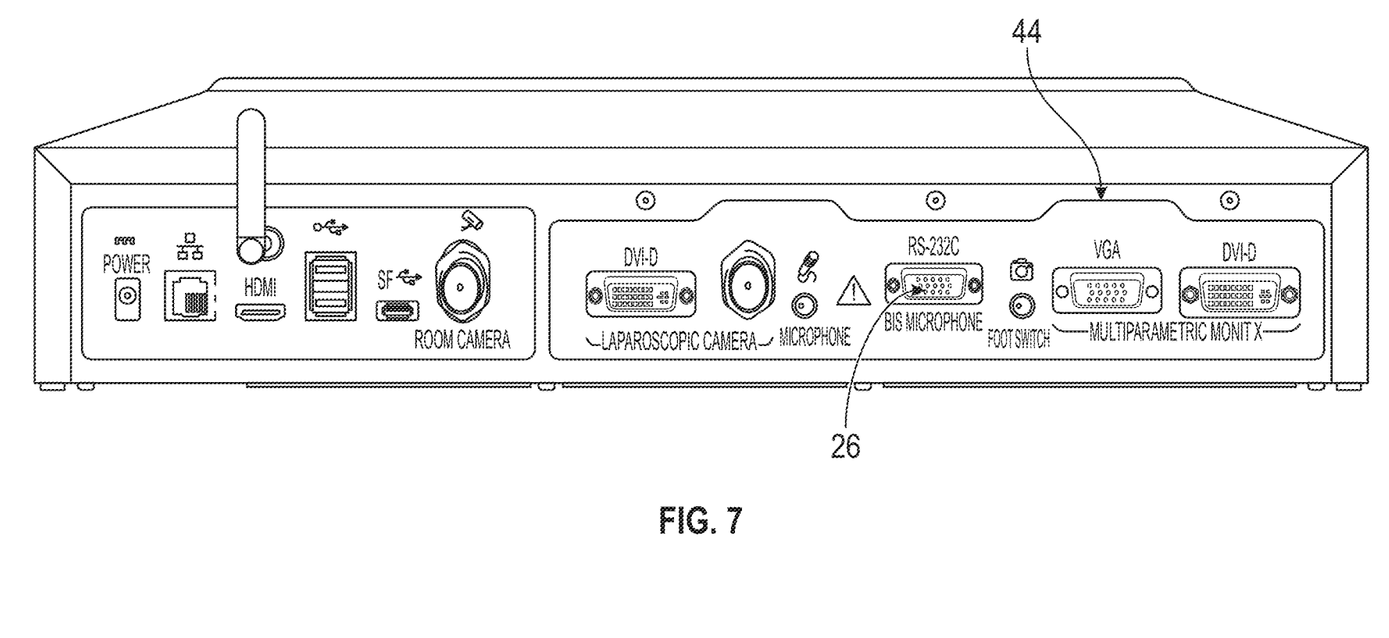
FIG. 7 shows a rear view of an embodiment of the integrator (10), prominently showing the external indicator (44) of the isolated inputs.

To facilitate assembly and prevent improper connections, as shown in FIG. 7, the integrator (10) has an external indicator (44), which indicates which peripherals are connected to the electrical isolators (40) (indication in yellow) and, thus, they may be close to or in contact with the patient. In the gray area, there are the inputs/outputs of the peripherals that are in the non-isolated area and, therefore, must be at a minimum distance of 1.5 m from the patient. Furthermore, the device itself is installed at a minimum distance of 1.5 meters from the patient.

Example 2—Device for Storing Clinical-Surgical Data Applied in Surgical Environments The storage device from example 2 contains physical media that provide different patterns of clinical data input, the ambient camera (analog) can be connected by the video input or the network port (digital), network connection input, input for the vital signs monitor (VGA or DVI-D) and BIS module (RS-232), etc. In the embodiment of FIG. 1, the following input connectors are shown: power supply (P4), cloud connection (Wi-Fi and Ethernet), surgical environment video (BNC or IP camera), digital laparoscopic (DVI-D or CVBS), microphone (P2), BIS monitor (RS-232C), instant photo (P2 Pedal), vital instruments (DVI-D or VGA) and USB connections (Touch keyboard/Mouse).

The device of this embodiment of the invention has the following output elements shown in FIG. 2: network interface (Ethernet and Wi-Fi), front USB data transfer interface, image display (13) (HDMI), audio (high internal speaker), front P2 (external speaker). Also, said image display (13) is provided with touch screen technology, alternatively allowing the user to use a mouse and/or an alphanumeric keyboard to operate the interface.

In addition, the storage device comprises: mirrored storage disks, a security lock to prevent unauthorized removal and a battery for operation in the event of a power failure.

Also, the processor (11) implemented in the integrator (10) includes a firmware (FW) that includes drivers and support for the operating system, along with several software modules (SW) that meet the various functionalities specified for the equipment, performing capture and audio and video compression, storage (local and cloud), data encryption, user interface for data access, separated by user with access key (password), among others.

With that, the processor (11) was configured to receive the video signals from the integrator (10), wherein each video signal has its respective resolution, which can all be in the same resolution (e.g., full HD) or all in different resolutions. In this sense, the video signals are identified by the processor's resizing and composition block (11) and are submitted to a resolution adjustment so that, later, they are reproduced in a single video image on a display. In this implementation, the display had a full HD resolution (i.e., 1920×1080) and, with that, the input video signals were adjusted to be reproduced in blocks to compose a full HD image. For the resizing of the input videos, downscaling algorithms were implemented in the processor itself (11).

Thus, the video signal generated by the processor (11) was transferred to the local storage (12) and, in parallel, reproduced on the image display (13). After the end of the surgical event, the processor (11) is responsible for generating a file with the data (encrypted) and sending this file to the remote storage (30). Once the encrypted file is completely transferred to the remote storage (30), the processor (11) automatically deletes the file in the local storage (12) to free up local space for further applications. To ensure that the file has been completely transferred to the remote storage (30), the processor (11) executes checksum routines, which verify that the file has been fully transferred, and having confirmed the complete transfer, the processor (11) erases the local file.

The cloud remote storage (30) in the system, in turn, aims to store the data and make it available for viewing anywhere, using a browser (internet browser that allows viewing of stored events—e.g., Google Chrome® or FireFox®). This component is a service for storing and streaming videos on demand. The transmission of the event from the device to the cloud takes place automatically and, therefore, it does not depend on the user.

Furthermore, the device allows instant freezes (or photographs) to be taken of the images being acquired by activating the specific interface for this purpose, through the image capture. The images can be used for documentation purposes and preparation of medical reports, already taking advantage of the images generated in the surgery. The image capture is activated by the operator by means of a pedal (25) positioned next to it. The captured images are automatically exported in a specific format according to the application, being in this case exported in the DICOM standard, facilitating the report generation.

Those skilled in the art will appreciate the knowledge showed herein and will be able to reproduce the invention in the embodiments presented and in other variants and alternatives covered by the scope of the following claims.

The invention claimed is:

1. A device for storing encrypted clinical-surgical data coming from at least one clinical-surgical event comprising at least one integrator (10) configured to receive and store clinical-surgical data from a plurality of signal sources (20) connected to the at least one integrator (10), said plurality of signal sources (20) comprising a laparoscopic camera, a multiparameter monitor, a BIS monitor, a camera room, a pedal, and a microphone, and said clinical-surgical data being video signals provided by the plurality of signal sources (20), in which the at least one integrator (10) is provided with at least one processor (11) capturing the clinical-surgical data received by the at least one integrator (10), said at least one processor (11) being provided with at least one block of resizing and composition of clinical-surgical data configured to integrate the video signals into a single video image, wherein the at least one integrator (10) comprises at least one electrical isolator (40) which electrically isolates the at least one integrator (10) from electrical currents coming from the plurality of signal sources (20) connected to the at least one integrator, wherein the at least one electrical isolator (40) comprises:

at least one digital isolator (47) positioned between the plurality of signal sources (20) and the at least one processor (11), wherein one of the at least one digital isolator (47) is implemented for each signal source of the plurality of signal sources (20); and a physical isolation barrier (46) arranged between at least two inputs and outputs terminals of the at least one digital isolator (47) for physical connections of the plurality of signal sources (20), wherein the video signals provided by the plurality of signal sources (20) are directed to the at least one digital isolator (47) to be converted into an isolated video signal and subsequently being directed to the at least one processor (11) to be integrated into a single video image.

2. The device for storing encrypted clinical-surgical data according to claim 1, wherein the at least one digital isolator (47) comprises an interface with input and output, in which a set of signals from each of the at least one signal sources (20) is transferred between the input and output of the at least one digital isolator (47) in isolation and directed to the at least one processor (11).

3. The device for storing encrypted clinical-surgical data according to claim 2, wherein the at least one digital isolator (47) is electrically powered by an isolated DC/DC converter, which receives electrical power from a general electrical source of the at least one integrator (10) and transfers isolated electrical power to the at least one digital isolator (47).

4. The device for storing encrypted clinical-surgical data according to claim 2, wherein the at least one digital isolator (47) comprises at least one of:
a) capacitive isolation;
b) inductive isolation; or
c) optical isolation.

5. The device for storing encrypted clinical-surgical data according to claim 1, wherein the physical isolation barrier (46) is arranged between input and output terminals of the at least one digital isolator (47).

6. A system for storing encrypted clinical-surgical data from at least one clinical-surgical event, the system comprising:
a) at least one signal source (20);
b) at least one device for storing encrypted clinical-surgical data (1), said device being as defined in claim 1; and
c) at least one remote storage (30) connected with said device for storing encrypted clinical-surgical data;
wherein said device for storing encrypted clinical-surgical data (1) communicates with the at least one signal source (20), and said at least one integrator (10) is configured to receive and store clinical-surgical data from the at least one signal source (20);
wherein the integrator (10) comprises at least one electrical isolator (40) which electrically isolates the at least one integrator (10) from electrical currents coming from the at least one signal source (20) connected to the at least one integrator (10), wherein the at least one electrical isolator comprises:

at least one digital isolator (47) positioned between the at least one signal source (20) and the processor (11), wherein one of the at least one digital isolator (47) is implemented for each of the at least one signal source (20); and a physical isolation barrier (46) arranged between at least two inputs and outputs terminals of the at least one digital isolator (47) for physical connections of the at least one signal source (20), wherein the video signals are directed to the at least one digital isolator (47) to be converted into an isolated video signal and subsequently being directed to the at least one processor (11) to be integrated into a single video image.

7. A process for storing encrypted clinical-surgical data from at least one clinical-surgical event, being implemented in at least one device for storing encrypted clinical-surgical data, wherein said at least one device is as defined in claim 1, comprising the steps of:

a) receiving clinical-surgical data by an integrator (10), with clinical-surgical data being video signals originated from a plurality of signal sources (20);

b) directing the clinical-surgical data to at least one input of at least one digital isolator (47), wherein the at least one digital isolator (47) converts the clinical-surgical data into isolated clinical-surgical data, transferring them to an output of the at least one digital isolator (47);

c) directing isolated clinical-surgical data to at least one input of a processor (11);

d) resizing of clinical-surgical data isolated by the processor (11) into a single video image; and e) sending, by the processor (11), the resized clinical-surgical data to at least one of: an image display (13); a local storage (12); a remote storage (30); or a combination thereof.

8. The process for storing encrypted clinical-surgical data according to claim 7, wherein the integrator (10) comprises a physical isolation barrier (46), which is arranged between input and output terminals of the at least one digital isolator (47).

9. The process for storing encrypted clinical-surgical data according to claim 7, wherein:

a) at least one of the video signals is directed to a slowdown step;

b) the slowed down video signal is directed to the input of the at least one digital isolator (47), wherein the slowed down video signal is converted to an isolated video signal; and c) the isolated video signal is directed to a video signal converter, subsequently being directed to the processor (11).

* * * * *